July 9, 1940.    C. J. ANDERSON, JR    2,207,496
POWER TRANSMISSION
Original Filed Oct. 20, 1932    3 Sheets-Sheet 1

Inventor
CHARLES J. ANDERSON JR.
By Ralph L Tweedale
HIS Attorney

July 9, 1940.     C. J. ANDERSON, JR     2,207,496
POWER TRANSMISSION
Original Filed Oct. 20, 1932     3 Sheets-Sheet 2

Inventor
CHARLES J. ANDERSON JR.
By Ralph L. Tweedale
His Attorney

Patented July 9, 1940

2,207,496

UNITED STATES PATENT OFFICE 2,207,496

POWER TRANSMISSION

Charles J. Anderson, Jr., Jamestown, N. Y.; Edith W. Anderson, executrix of said Charles J. Anderson, deceased, assignor to Edith W. Carlson Application October 20, 1932, Serial No. 638,816
Renewed June 26, 1937

16 Claims. (Cl. 64—11)

This invention relates to resilient power transmitting elements for transmitting power from one shaft to another, and at the same time introducing torsional resilience. More particularly it relates to a shaft section composed principally of a highly flexible resilient material such as rubber, and which is adapted to yield resiliently to the application of torque thereto. The objects of this invention are:

(1) To provide a torsionally resilient power transmitting device capable of considerable torsional deflection under large torque loads without knotting. In certain types of automatic continuously variable torque converters, means must be provided for resiliently transmitting the output torque thereof. It is possible to use for this purpose a simple shaft of rubber, of a length considerably greater than its diameter. However, when such a rubber shaft is loaded in torsion to high torque values, the compression of the rubber at the center of the shaft causes the same to expand in an endwise direction, and if the two end connections of the rubber shaft are immovable endwise, the endwise expansion of the rubber causes the shaft to knot. Obviously in practical everyday use, it would be impossible to utilize a simple rubber shaft which knotted under the maximum stresses that are applied to it. Knotting may be prevented by making the length of the shaft shorter relative to the diameter. However, if this is done, the shaft then becomes too stiff torsionally, and is not capable of a sufficiently large angular deflection for the purposes required in certain types of automatic continuously variable torque converters.

Other objects of the invention are:

(2) To provide a resilient power transmitting element, having means for permitting endwise expansion of said element;

(3) To provide a resilient power transmitting element having rigid means therein for restraining the deformation of a portion of said element;

(4) To provide a resilient power transmitting element having means acting in tension along the axis thereof for preventing extension of the element along said axis;

(5) To provide a resilient power transmitting element comprising a plurality of short sections of a highly flexible resilient material with flat rigid elements intimately secured between each of said sections;

(6) To provide a resilient power transmitting element composed principally of a highly flexible resilient material, having means therein for stressing said material uniformly throughout;

(7) To provide a resilient power transmitting element having a rigid guide means located therein for preventing lateral deformation of the same;

(8) To provide a resilient power transmitting element having means acting by inertia to constrain a plurality of sections of said element to motion in single planes;

(9) To provide a resilient power transmitting element of considerable length in relation to its transverse dimensions, having a different cross section at different points along its length;

(10) To provide a resilient flexible power transmitting element the transverse dimensions of which are varied in order to compensate for the excess torsional deflection thereof, caused by the inertia of the element itself under oscillating torsional stress.

Further objects and advantages of the present invention will be apparent from the following description, reference being made to the accompanying drawings wherein several embodiments of the present invention are clearly shown.

Figure 1:
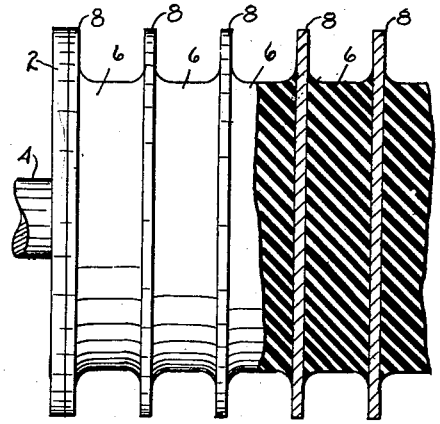
Fig. 1 is a side view partially in longitudinal cross section of a resilient power transmitting device embodying one form of the present invention.

In the embodiment of the invention shown in Fig. 1, a resilient power transmitting element is provided having a coupling means comprising a flange 2 secured to a shaft 4 for connection to a source of power. A similar flange and shaft, not shown, are provided at the opposite end thereof for connection to a load. The resilient element proper consists of a plurality of sections 6 forming a body of highly flexible resilient material, for example, rubber. For convenience hereafter such a material will be designated simply as rubber. These sections are preferably of cylindrical form, and of much shorter length than their outer diameter. Intermediate the sections 6 are a plurality of flat rigid elements 8, which may comprise sheet metal discs, and are preferably of greater diameter than the diameter of the sections 6, the portions thereof extending beyond sections 6 serving to dissipate heat developed in the sections 6. The sections 6 are intimately secured to the elements 8 as by vulcanization thereto.

In operation, when power is applied to the shaft 4, and the corresponding shaft at the opposite end of the device is connected to the resisting load, the sections 6 yield in torsion. The elements 8 being rigid, constrain the deflection of that portion of the sections 6 which is most adjacent to the elements 8, and permit only slight deflection in any direction in those portions of the sections 6. The torsional deflection of the sections 6 produces a shearing stress which is most intense at the outer portions of the sections 6. This stress causes a constricting action upon the inner portions of the sections 6 and causes the inner portions to expand endwise of the device which is the cause of knotting. The rigid elements 8 act to prevent the transmission of this constricting action by the outer portions of the sections 6 to the inner portions thereof, and thus prevent the endwise expansion of the inner portions of sections 8 and the resulting knotting.

Figure 2:
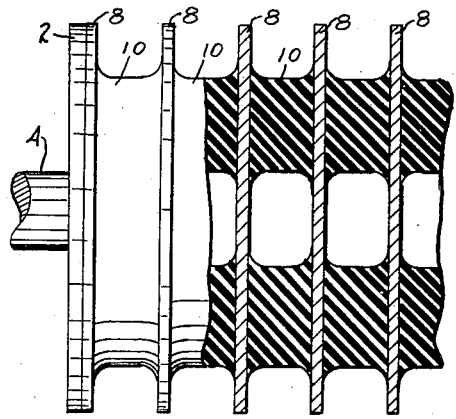
Fig. 2 is a view corresponding to Fig. 1 of a second form of the present invention.

In the embodiment of the invention shown in Fig. 2, the structure is similar to the embodiment of Fig. 1, except that the sections 10 which correspond to the sections 6 in Fig. 1 are of annular cross section, and provide a hollow space at the center of each section, and in between each pair of elements 8. This construction further tends to prevent knotting of the entire device, since the space at the center permits the innermost portion of the sections 10 to contract radially when compressed due to the torsional deflection of the outer portions of the sections 10. This reduces the endwise expansion of the innermost portions of the sections 10, and thereby further reduces the tendency of the device to knot under high torsional stress. Also the structure shown in Fig. 2 is advantageous in that there is no rubber at the center of section 10 which is the portion which is least deflected in torsion and therefore of the least use in such a device.

Figure 3:
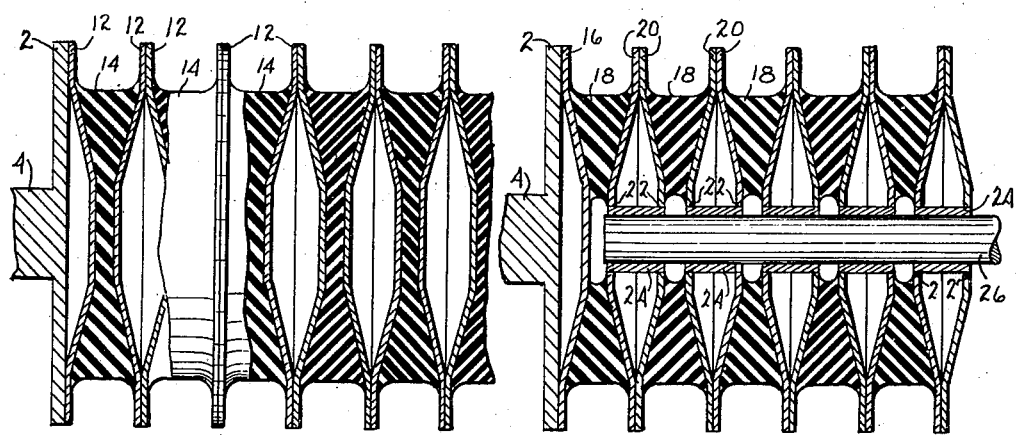
Fig. 3 is a view corresponding to Fig. 1 of a third form of the present invention.

In the embodiment shown in Fig. 3, the flange 2 and the shaft 4 are secured to a flat rigid element 12 in the form of a cupped disc, the cupped portion being in the shape of a very flat truncated cone. The sections 14 of rubber have secured to them as by vulcanization a disc 12 on either side thereof. The shape of the section 14 corresponds to the space between the two cupper discs 12 and is thicker i· the direction of the length of the whole device at the outside than it is at the center. The adjacent discs 12 are rigidly secured to each other at their peripheries by suitable fastening means.

In operation of this modification, the action to prevent knotting is similar to that in Fig. 1. This type of construction has further advantages over that shown in Fig. 1 in that the sections 14 are of varying thickness throughout the greater portion of their diameter, the thickness being proportional to the angular deflection at any distance from the center. In other words, for any total angular deflection of section 14, the outer portion of one disc 12 moves through a greater linear distance relative to the other disc 12 than the inner portions thereof move. The thickness of the rubber between the discs 12 is correspondingly greater at the outer portions than at the inner portions, so that the unit stress of the rubber will be the same throughout the greater portion of its diameter. Since at the innermost portion, the unit stress is quite low, this portion may be made of equal thickness, or if desired, the discs may be cupped in the form of a complete cone, rather than a truncated cone, in order to produce uniform unit stress of the rubber throughout its entire diameter. Another advantage of the type of construction shown in Fig. 3 is that a complete resilient power transmitting element may be made more cheaply since it is necessary to build a mould to produce only a single section 14 with its adjacent discs 12. A plurality of these sections may be made from this one mould, and later united by fastening the peripheries of the discs 12 together.

Figure 4:
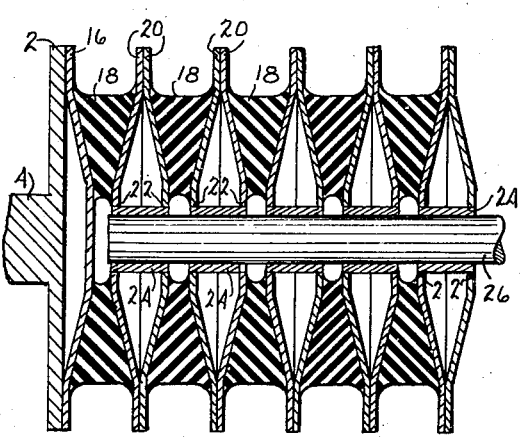
Fig. 4 is a view corresponding to Fig. 1 of a fourth form of the present invention.

In the form of the invention shown in Fig. 4, the construction is similar to that of Fig. 3 except that additional means have been provided to prevent absolutely all tendency to knot. In this form of the invention the flange 2 and shaft 4 are secured to a disc 16 similar to the disc 12 of Fig. 3. The sections 18 of rubber are intimately secured as by vulcanization to the discs 16, and to other discs 20, corresponding to the discs 12 of Fig. 3. The discs 20 have holes 22 formed at their centers. Rigidly secured in the holes 22 of each adjacent pair of discs 20 is a bushing 24. The bushing 24 may be made of porous bronze or other bearing material, and may be impregnated with lubricant as is well known in the art. The sections 18 are hollow at their centers. Through the bushings 24 and the hollow portions of the sections 18, a shaft 26 is inserted, and fits in the bushings for free rotation therein.

In operation, this form of the invention acts similarly to the form shown in Fig. 3, except that the shaft 26 maintains the bushings 24 in true alignment as well as the discs 20 secured thereto. In this manner, all tendency to knot is completely prevented, since the shaft 26 is preferably made of such size that it will have only negligible deflection under the maximum stress that the sections 18 will stand.

Figure 5:
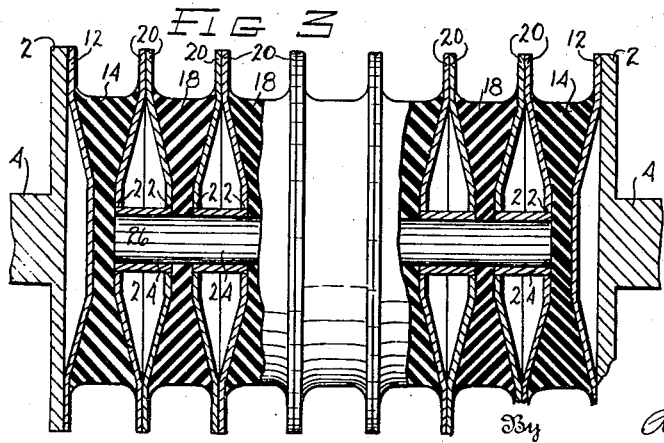
Fig. 5 is a view corresponding to Fig. 1 of a fifth form of the present invention.

In the form of the invention shown in Fig. 5, the flanges 2 and the shaft 4 are secured to a disc 12 identical to the discs 12 in Fig. 3. Intimately secured to each disc 12 is a section 14 of rubber identical to the corresponding section 14 in Fig. 3. On the other side of section 14 is secured thereto a disk 20 like the disc 20 in Fig. 4. The rest of the device between the two sections 14 is formed like the device shown in Fig. 4 of a plurality of discs 20 and sections 18, having the bushings 24 located in the holes 22 in discs 20, and the shaft 26 freely rotatable within the bushings 24. The action of this form of the invention is similar to that of Fig. 4 except that the sections 14 at either end permit of a small amount of misalignment between the two shafts 4 at either end.

Figure 6:
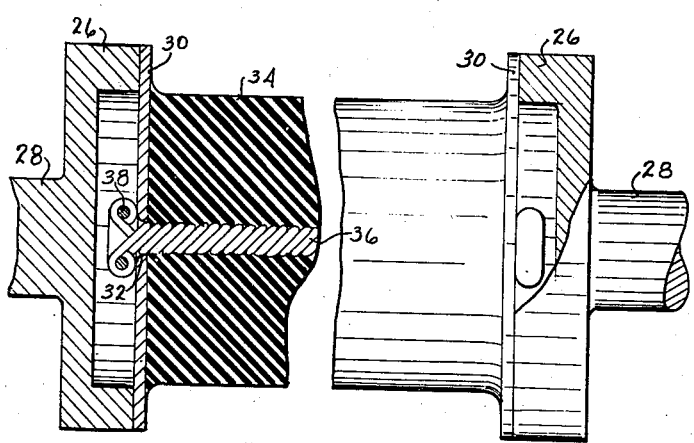
Fig. 6 is a view corresponding to Fig. 1 of a sixth form of the present invention.

In the form of the invention shown in Fig. 6, there is shown a resilient power transmitting device having flanges 28 secured to the shafts 28 at either end thereof. Secured to each flange 28 is a metal disc 30, having a hole 32 at the center thereof. Intermediate the discs 30 is located a long section 34 of rubber, which is intimately secured to the discs 30 as by vulcation. A tension member 36 is located in the center of the section 34, and passes through the holes 32 in the discs 30. The tension member 36 is preferably composed of cotton cords twisted to form rope, and secured to fastening rings 38 at the outside of the discs 30. The tension member 36 may be placed in the section 34 before the same is vulcanized, so that it will be intimately secured to the rubber of section 34.

In operation of this form of the invention, the member 36 being substantially inextensible in tension prevents knotting of the section 34 under torsional stress by preventing endwise expansion of the section 34. In other words, the tension element 36 acts to prevent increase in length of the section 34 which is necessary for the same to knot.

Figure 7:
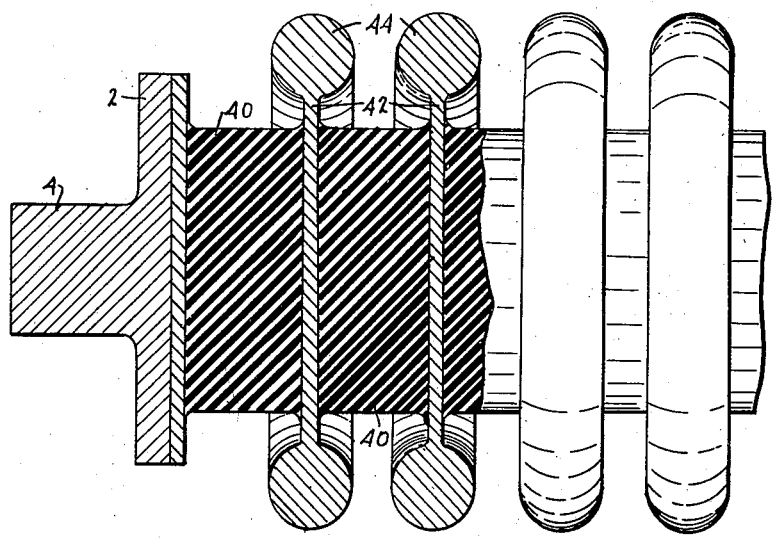
Fig. 7 is a view corresponding to Fig. 1 of a seventh form of the present invention.

In Fig. 7, there is shown the form of the invention in which inertia is used to maintain portions of the sections of rubber rotating in the same planes. The sections 40 are similar to the sections 6 of Fig. 1, and are intimately secured to flat rigid metal elements 42 corresponding to the elements 8 of Fig. 1. The elements 42 have a rim 44 of large cross section to increase the moment of inertia thereof. The high moment of inertia of the elements 42 produces a gyroscopic effect which tends to prevent movement of the element 42 out of its normal plane of rotation. The element 42 being intimately secured to the sections 40 will act to prevent knotting in the same manner as that described in Fig. 1. The inertia effect of the rim 44 produces a further tendency to avoid knotting of the device. The type of construction in this modification with the heavy rim 44 may also be used in the forms of the invention disclosed in Figs. 2, 3, 4, 5.

Figure 8:
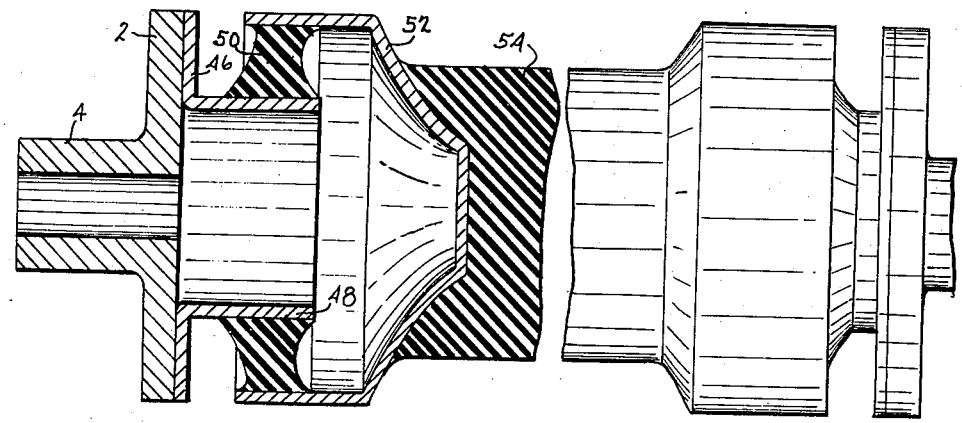
Fig. 8 is a view corresponding to Fig. 1 of an eighth form of the present invention.

In Fig. 8 there is shown another form of the invention in which knotting is prevented by permitting the end anchorages of the resilient element to yield axially under the endwise expansion forces produced in a resilient element by torsional stress thereof. The flange 2 and shaft 4 have secured thereto the flanged tube 46. On the cylindrical portion 48 of the flanged tube 46 there is secured an annulus 50 of rubber as by vulcanization. the outer surface of the annulus 50 is secured as by vulcanization to a cup member 52 surrounding the same. The cup member 52 carries secured thereto as by vulcanization the section 54 of rubber which may comprise a small cylindrical shaft of such material. The structure just described is duplicated at the other end of the section 54.

The operation of this form of the invention depends upon the principle of permitting endwise expansion of the section 54 under torsional stress. When the section 54 is stressed torsionally, the resulting compression of the inner portion thereof expands the same endwise along the axis. If the cups 52 were immovable in an endwise direction this expansion would have to take place by forming a knot in the section 54. However, knotting is prevented by permitting the cup 52 to move longitudinally to the left in Fig. 8, the resilient annulus 50 permitting this movement relative to the tube 46.

Figure 9:
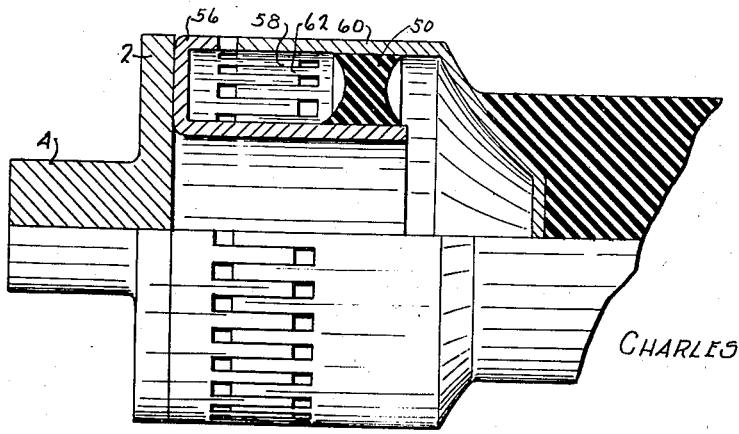
Fig. 9 is a view corresponding to Fig. 1 of a ninth form of the present invention.

In Fig. 9, there is shown a slight modification of the form of the invention shown in Fig. 8 in which means is provided for preventing the torsional stress in the annular section 50. The construction is substantially identical to that of Fig. 8 with the exception that in place of the tube 46 an equivalent member 56 is provided having a series of longitudinally extending teeth 58 thereon. In place of the cup member 52 a corresponding cup member 60 is provided, having longitudinally extending teeth 62 thereon which interfit with the teeth 58. The length of the teeth 58 and 62 is such that longitudinal movement of the cup 60 relative to the tube member 56 may take place, the annulus 50 yielding resiliently to permit this. The interfitting teeth 58 and 62, however, prevent any relative rotation between the members 56 and 60. In this way, the annulus 50 is only stressed in lateral flexure, and is not given a simultaneous torsional flexure such as takes place in the annulus 50 of Fig. 8.

Figure 10:
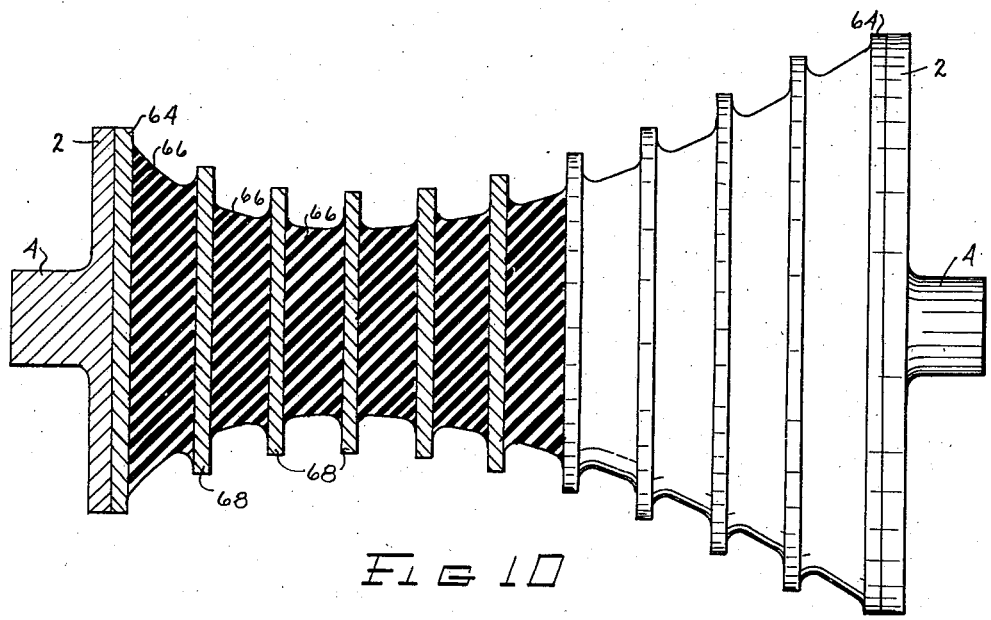
Fig. 10 is a view corresponding to Fig. 1 of a tenth form of the present invention.

In Fig. 10 there is shown a form of the invention wherein the size of the resilient section of the device is varied throughout its length in order to compensate for the added stresses introduced by the inertia of the resilient section itself, when one end of the section is given an oscillating motion. It has been found that when a resilient element of a uniform cross section throughout its length is used in a device with means for oscillating one end thereof that the inertia of the resilient section itself causes a greater degree of oscillation in the central portion of the section than would take place normally if the section had no inertia. In order to overcome this unnecessary additional stress of the resilient section, it has been found desirable to reduce the diameter of the central portion of the section, and also to make the portion of the section nearer the oscillating end of the device of smaller dimensions than the portion nearest the non-oscillating end. In the structure shown, the flanges 2 and the shafts 4 are secured to discs 64, corresponding to discs 8 in Fig. 1. The resilient section may preferably comprise plurality of sections 66 of rubber with the interjacent rigid elements 68. The form of the sections 66 and elements 68 may be similar to any of the forms shown in Figures 1, 2, 3, 4, and 5, or the whole resilient section may be formed in the manner shown in any of the other figures of the drawings, the principal feature of the present form of the invention being that the resulting peripheral outline of the whole resilient section is in the shape of a curve, such as that shown on the drawings, the resilient element being of greater diameter at the right hand or non-oscillating end than it is in the central sections and in the left end or oscillating end. It is also possible to achieve practically the same result by making the peripheral outline in the form of a truncated cone, the diameter increasing uniformly from the oscillating end to the non-oscillating end.

Due to the varying dimensions of the different portions of the resilient element, the moment of inertia is correspondingly varied throughout the length of the same, so that the portions which oscillate through the widest angle due to the oscillating torque applied to the shaft 4 have a smaller moment of inertia than the portions of the resilient element which oscillate through a lesser angle. In this way, the added torsional stresses produced by the inertia of the wider oscillating portions are applied to portions of the resilient element having a greater torsional stress capacity.

Thus, it will be seen that this invention provides several forms of means for preventing knotting of a comparatively long torsional resilient element composed of a highly flexible resilient material, and also provides a form of resilient element in which the added stresses caused by the inertia of the resilient element itself under an oscillating motion of one end thereof are compensated for.

What is claimed is as follows:

1. A resilient coupling element comprising a body of highly flexible resilient material, load imposing and load receiving coupling means each connected to said body, the relation between the total length of said body of resilient material intermediate said coupling means and the cross-sectional area thereof being such that a large angular displacement of said coupling means is produced under safe torsional stress and means for preventing knotting of said body of highly flexible resilient material when loaded in torsion.

2. A resilient power transmitting element comprising a body of highly flexible resilient material, coupling means at one end thereof for connection with a source of power, coupling means at the opposite end for connection with a load, the relation between the total length of said body of resilient material intermediate said coupling means and the cross-sectional area thereof being such that a large angular displacement of said coupling means is produced under safe torsional stress and means for preventing knotting of said body of highly flexible resilient material when loaded in torsion, said last named means being located in said body of highly flexible resilient material.

3. A resilient power transmitting element comprising a body of highly flexible resilient material, coupling means at one end thereof for connection with a source of power, coupling means at the opposite end for connection with a load, and means to provide for endwise expansion of said body of highly flexible resilient material when loaded in torsion whereby knotting of said body is prevented.

4. A resilient coupling element comprising a body of highly flexible resilient material, load imposing and load receiving coupling means each connected to said body, the relation between the total length of said body of resilient material intermediate said coupling means and the cross-sectional area thereof being such that a large angular displacement of said coupling means is produced under safe torsional stress and rigid means located in said body of highly flexible resilient material for restraining the deformation of a portion of said body.

5. A resilient power transmitting element comprising a body of highly flexible resilient material, coupling means at one end thereof for connection with a source of power, coupling means at the opposite end for connection with a load, the relation between the total length of said body of resilient material intermediate said coupling means and the cross sectional area thereof being such that a large angular displacement of said coupling means is produceld under safe torsional stress means acting in tension in the direction of the rotational axis of said element for preventing extension of said body along said axis, said means being freely flexible under torsional loads and substantially inextensible under longitudinal tension.

6. A resilient power transmitting element comprising a plurality of sections of highly flexible resilient material, a plurality of disc-like elements of rigid material intimately secured between said sections of highly flexible resilient material, coupling means at one end of said element for connection to a source of power and coupling means at the opposite end thereof for connection to a load.

7. A resilient power transmitting element comprising a plurality of sections of highly flexible resilient material, a plurality of disc-like elements of rigid material intimately secured between said sections of highly flexible resilient material, coupling means at one end of said element for connection to a source of power and coupling means at the opposite end thereof for connection to a load, said sections of highly flexible resilient material being of cylindrical cross section.

8. A resilient power transmitting element comprising a plurality of sections of highly flexible material, a plurality of disc-like elements of rigid material intimately secured between said sections of highly flexible resilient material, coupling means at one end of said element for connection to a source of power and coupling means at the opposite end thereof for connection to a load, said rigid elements being thicker at the center than at the periphery thereof.

9. A resilient power transmitting element comprising a plurality of sections of highly flexible resilient material, a plurality of disc-like elements of rigid material intimately secured between said sections of highly flexible resilient material, coupling means at one end of said element for connection to a source of power and coupling means at the opposite end thereof for connection to a load, said sections of highly flexible resilient material being thinner at their centers than at their peripheries.

10. A resilient power transmitting element comprising a body of highly flexible resilient material, coupling means at one end thereof for connection with a source of power, coupling means at the opposite end for connection with a load, a flexible connection at each end of said element to provide for endwise expansion of said element under torsional stress.

11. A resilient power transmitting element comprising a body of highly flexible resilient material coupling means at one end thereof for connection with a source of power, coupling means at the opposite end for connection with a load, a flexible connection at each end of said element to provide for endwise expansion of said element under torsional stress and means for preventing torsional flexure of said flexible connection.

12. A resilient coupling element comprising a body of highly flexible resilient material, load imposing and load receiving coupling means each connected to said body the relation between the total length of said body of resilient material intermediate said coupling means and the cross sectional area thereof being such that a large angular displacement of said coupling means is produced under safe torsional stress and means for preventing knotting of said body of highly flexible resilient material when loaded in torsion to any degree within the elastic limit of the element.

13. A resilient coupling element comprising a body of highly flexible resilient material, load imposing and load receiving coupling means each connected to said body the relation between the total length of said body of resilient material intermediate said coupling means and the cross sectional area thereof being such that a large angular displacement of said coupling means is produced under safe torsional stress relatively non-resilient means at the rotational axis of said element for preventing extension of said body along said axis, said means being freely flexible under torsional loads and substantially inextensible under longitudinal tension.

14. A spring comprising load imposing and load receiving members having a plurality of adjacent cylinders of elastic material with metal therebetween, each of said cylinders of elastic material varying in axial length substantially with the radius whereby the unit shear stress at any given load remains substantially constant within any elastic cylinder.

15. A spring comprising load imposing and load receiving members having a plurality of adjacent cylinders of rubber with metal therebetween, the end surfaces of the rubber cylinders being substantially conical and non-parallel.

16. A spring comprising load imposing and load receiving members having a plurality of adjacent cylinders of rubber with metal therebetween, the end surfaces of the rubber cylinders being non-parallel and at least one of said end surfaces being substantially conical.

CHARLES J. ANDERSON, Jr.